May 23, 1950 R. J. FAULKNER 2,509,092
TRACTOR SUPPORTED AND DRIVEN SAW MECHANISM
Filed Nov. 7, 1946 10 Sheets-Sheet 1

Inventor
Richard J. Faulkner.
By
Attorney

May 23, 1950 R. J. FAULKNER 2,509,092
TRACTOR SUPPORTED AND DRIVEN SAW MECHANISM
Filed Nov. 7, 1946 10 Sheets-Sheet 3
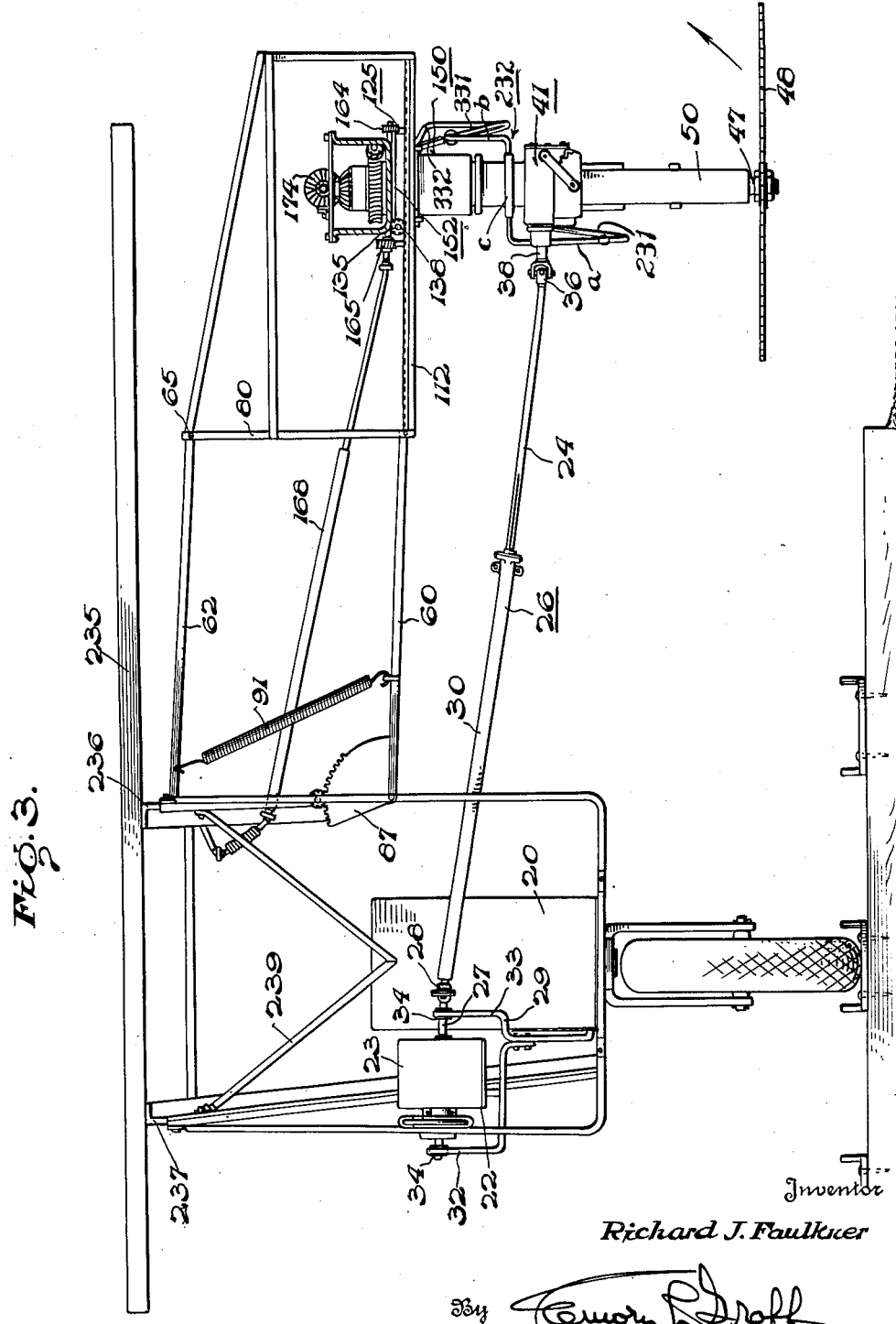
Fig. 3.
Inventor
Richard J. Faulkner
Attorney

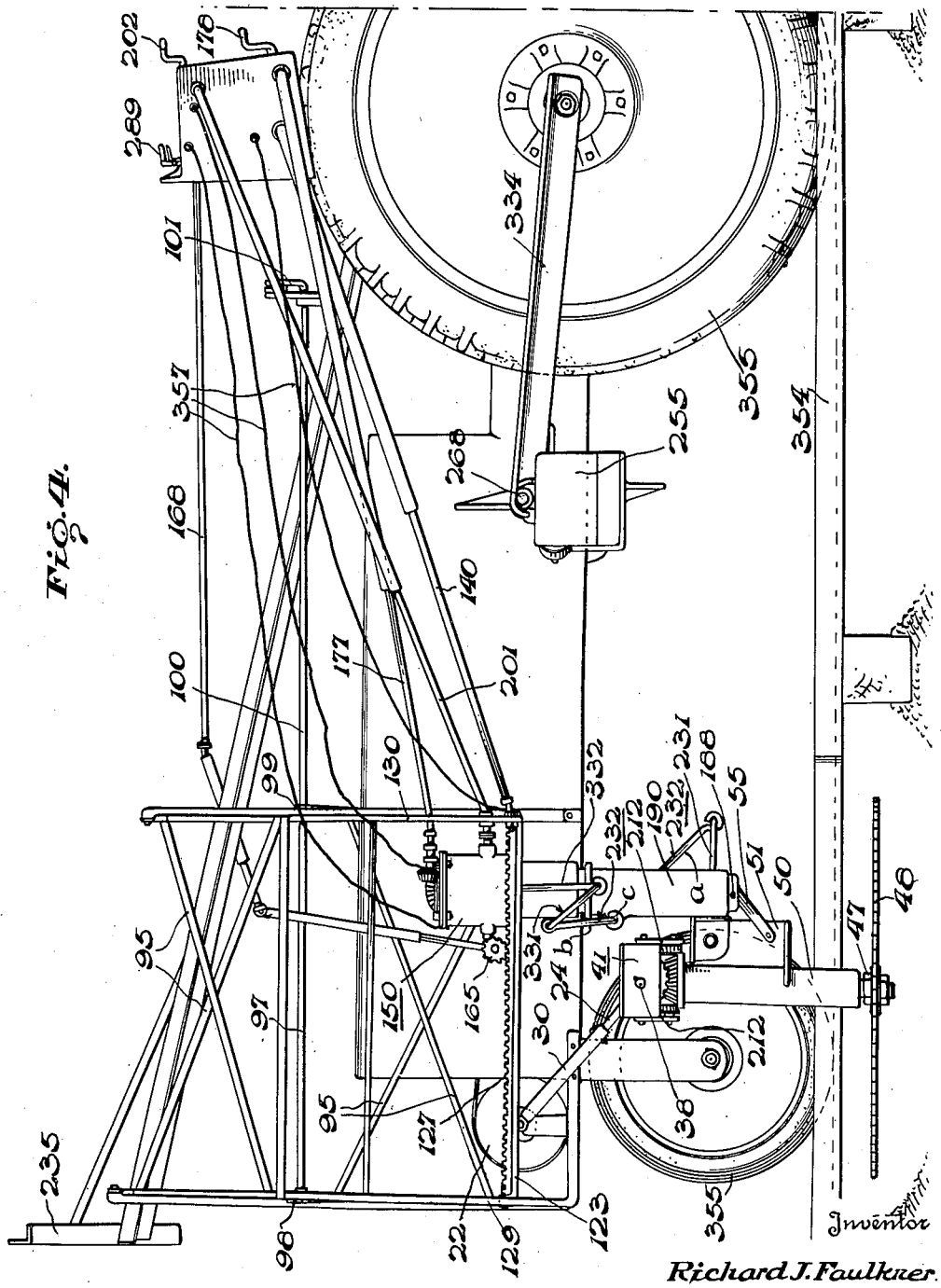

May 23, 1950 R. J. FAULKNER 2,509,092
TRACTOR SUPPORTED AND DRIVEN SAW MECHANISM
Filed Nov. 7, 1946 10 Sheets-Sheet 5
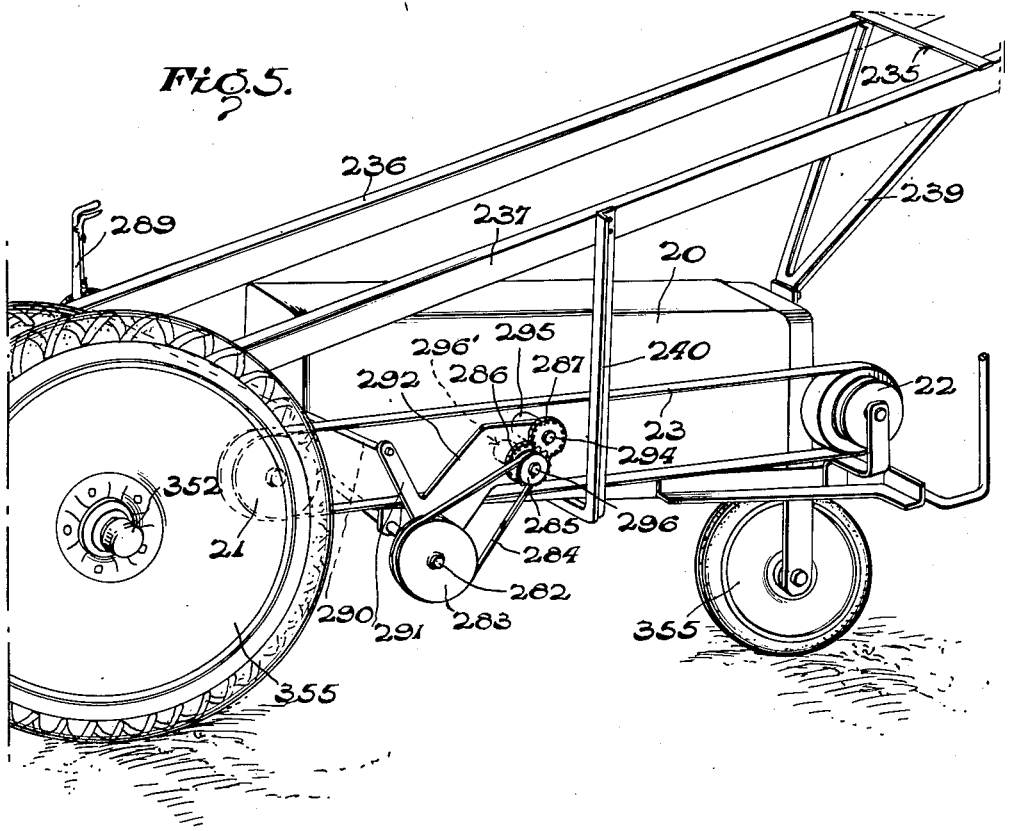
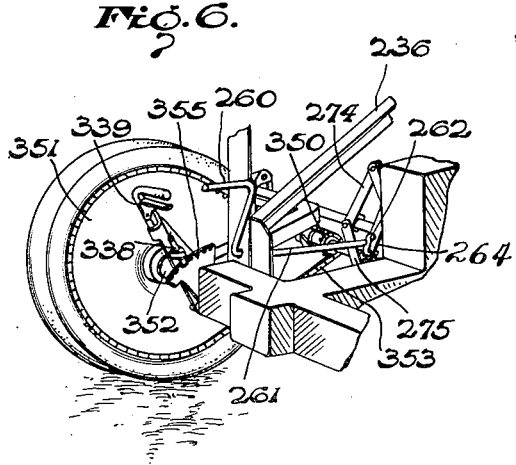
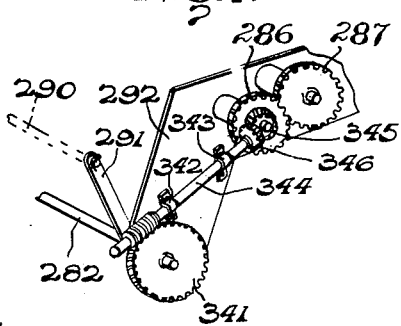
Inventor
Richard J. Faulkner May 23, 1950 R. J. FAULKNER 2,509,092
TRACTOR SUPPORTED AND DRIVEN SAW MECHANISM
Filed Nov. 7, 1946 10 Sheets-Sheet 6
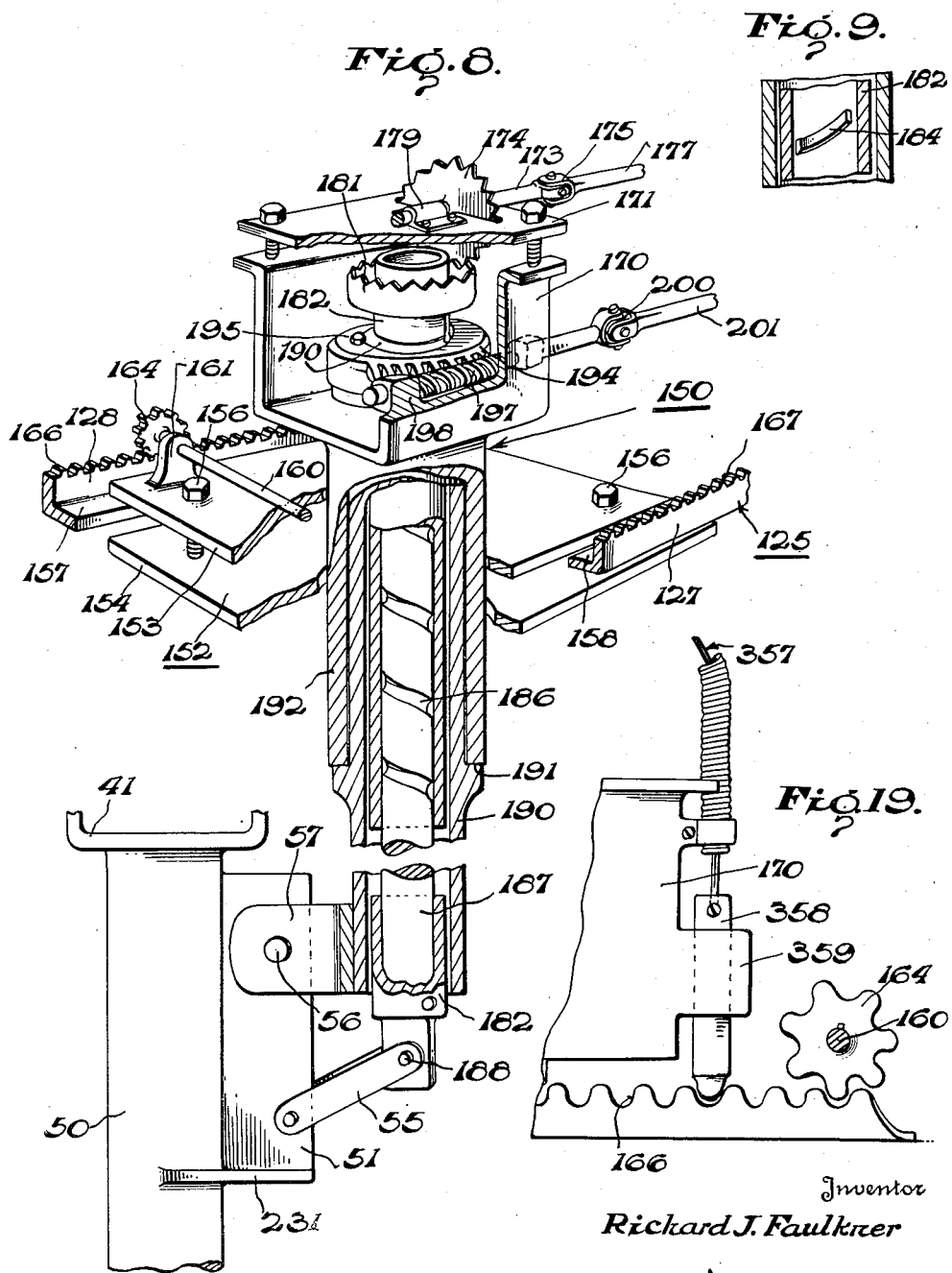
Inventor
Richard J. Faulkner
By [signature]
Attorney May 23, 1950     R. J. FAULKNER     2,509,092
TRACTOR SUPPORTED AND DRIVEN SAW MECHANISM
Filed Nov. 7, 1946     10 Sheets-Sheet 7
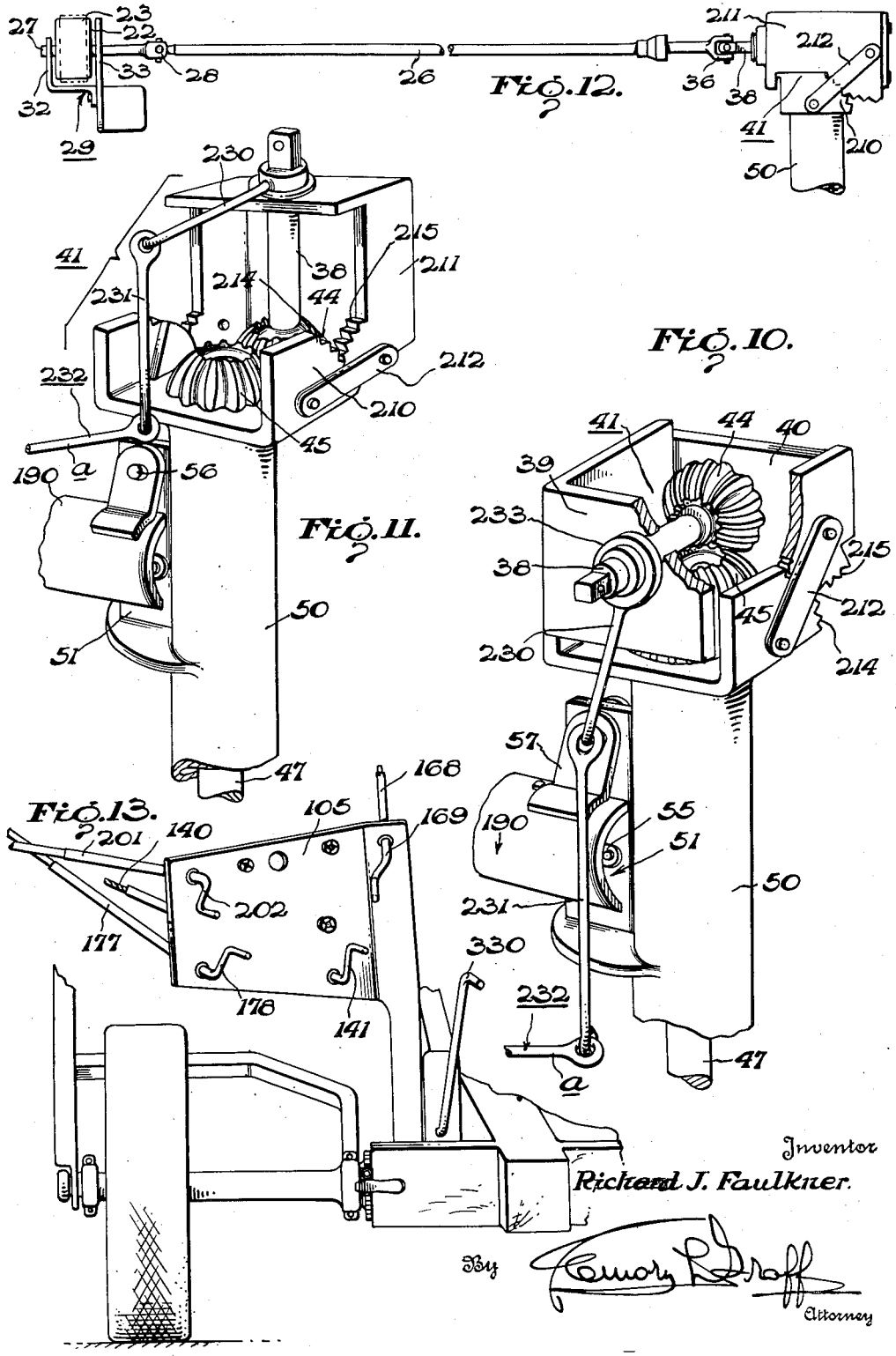
Inventor
Richard J. Faulkner.
By [signature]
Attorney May 23, 1950 R. J. FAULKNER 2,509,092
TRACTOR SUPPORTED AND DRIVEN SAW MECHANISM
Filed Nov. 7, 1946 10 Sheets-Sheet 8
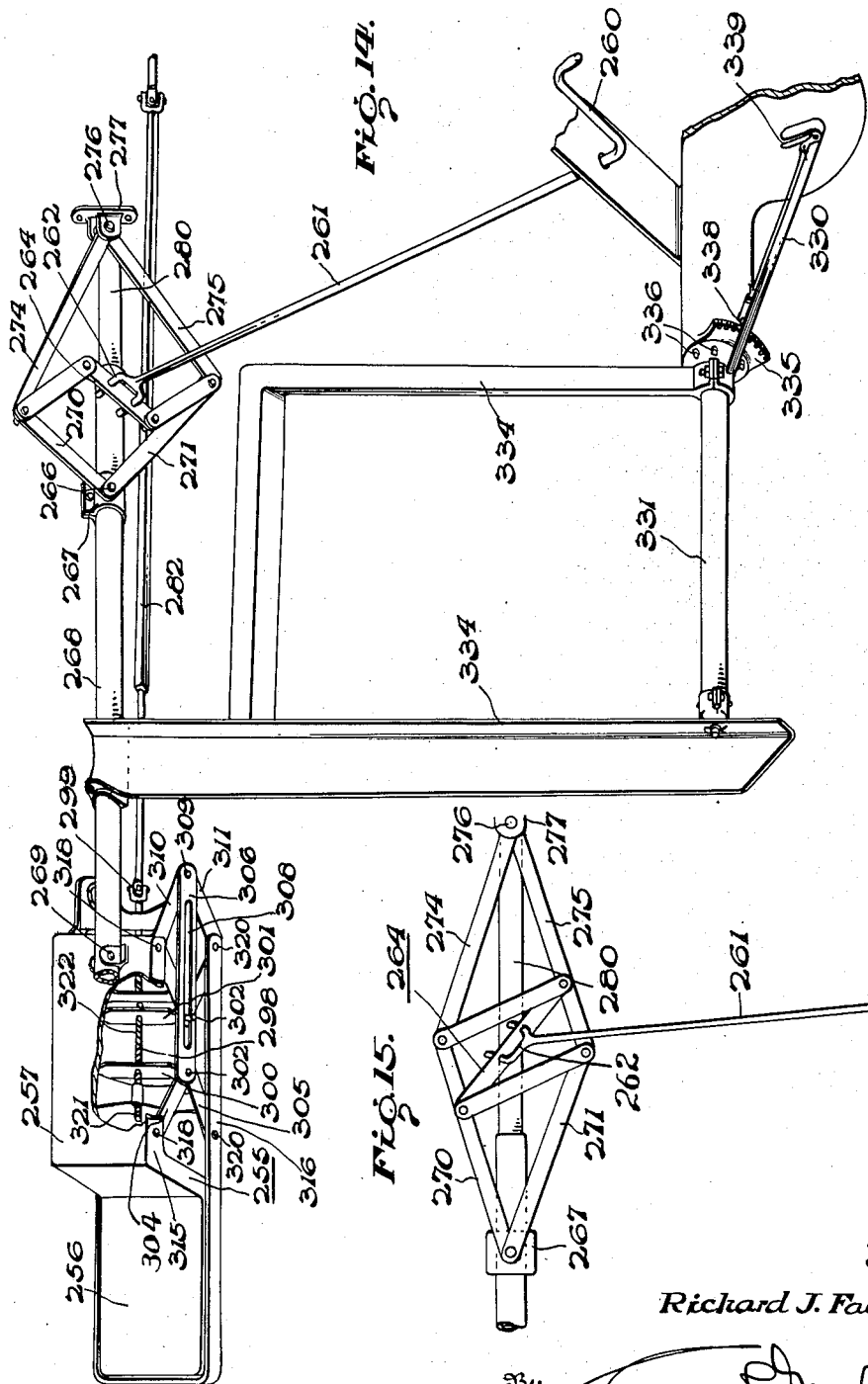
Inventor
Richard J. Faulkner.
By
Attorney

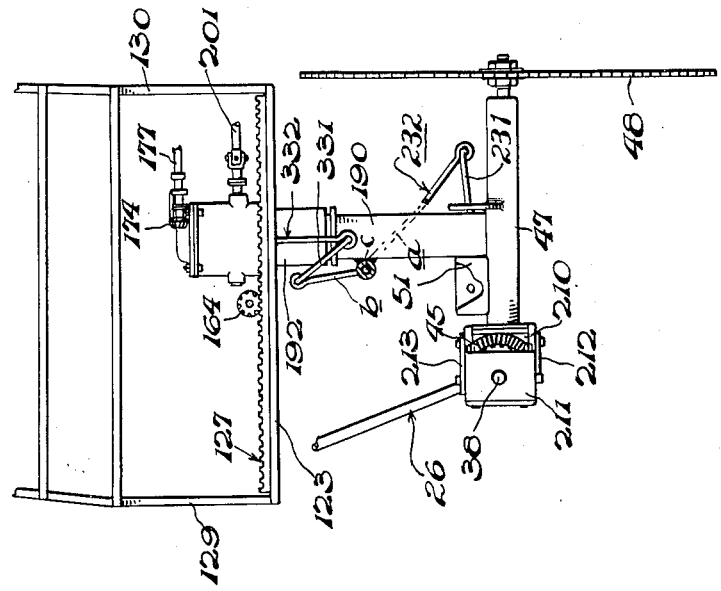
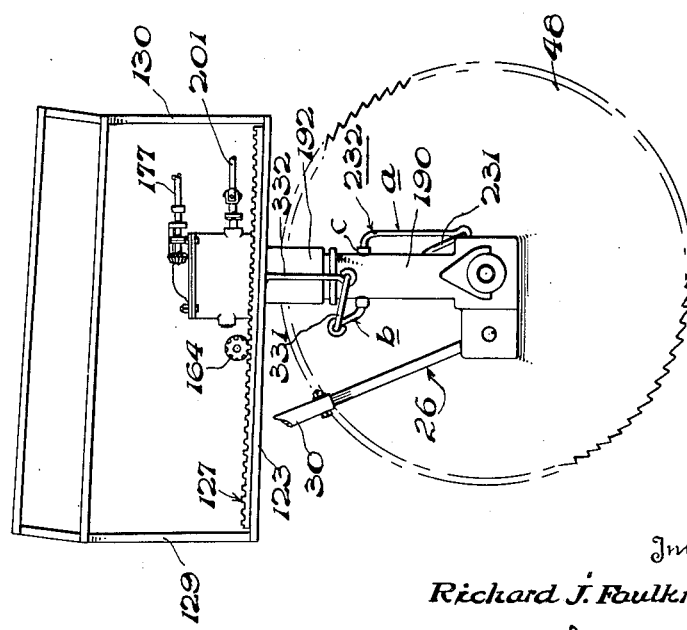
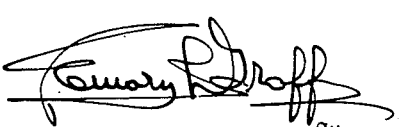

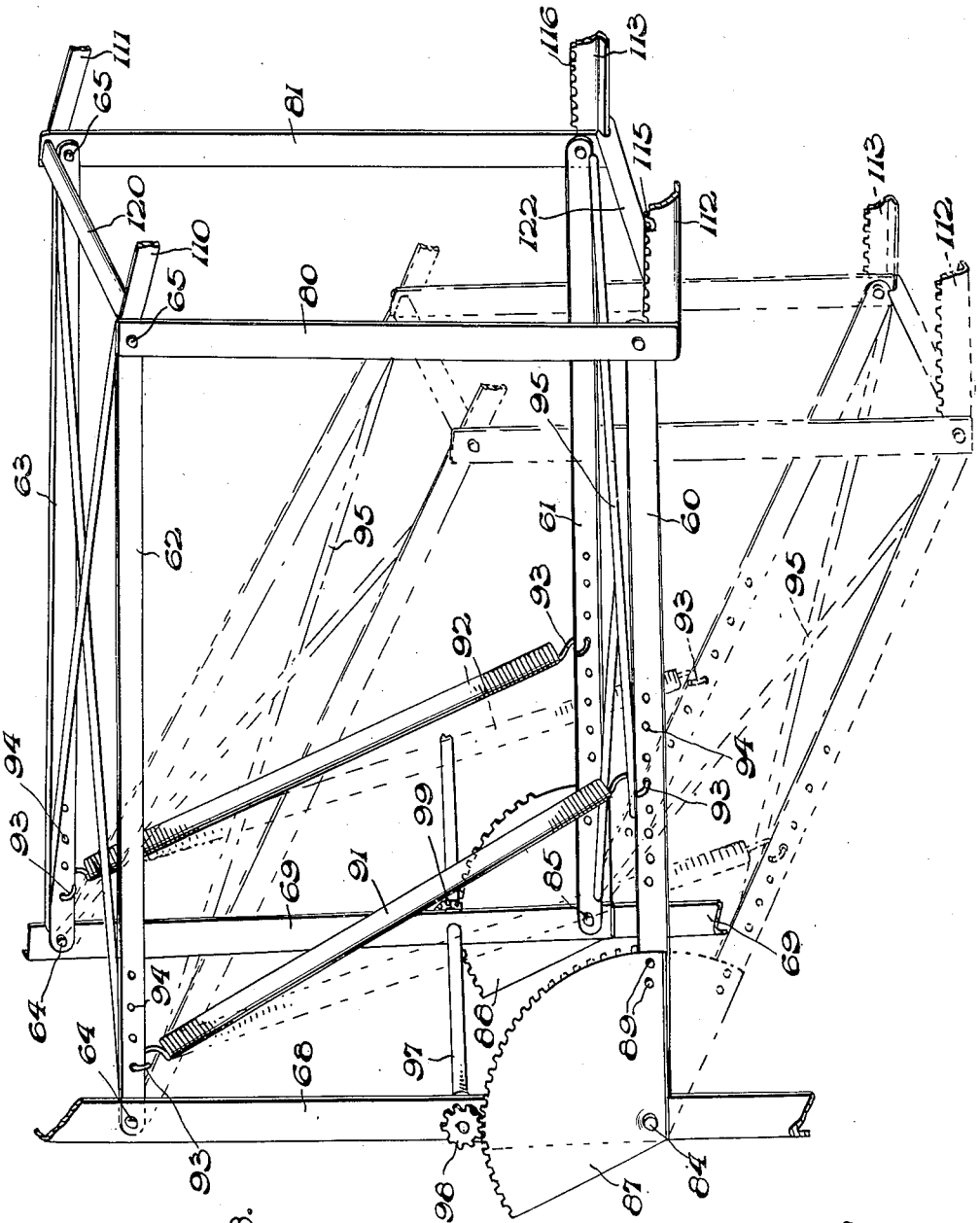

Patented May 23, 1950

2,509,092

UNITED STATES PATENT OFFICE 2,509,092

TRACTOR SUPPORTED AND DRIVEN SAW MECHANISM

Richard J. Faulkner, Dallas, Tex.

Application November 7, 1946, Serial No. 708,226

4 Claims. (Cl. 143—43)

My invention relates to tractor driven tool holder attachments, and more particularly to an attachment for a tractor having as a part of said attachment a tool holder for interchangeably mounting different tools, such as wood saws, post hole diggers and rotary planers.

The device will be described in detail with particular reference to the use of the attachment with a rotary wood saw, and an object of my invention is to provide a novel portable saw mill, whereby growing trees may be cut down and trimmed and cut longitudinally into boards and transversely into desired lengths by proper manipulation of a few control levers within easy reach of the driver's seat on the tractor.

Another object is to provide a novel power tool mounting for tractors, so arranged that the tool, such as a rotary saw, may be positioned and adjusted horizontally or vertically and at different heights with respect to the ground.

With these and other objects in view, the invention consists in the construction, arrangement and combination of parts hereinafter described and particularly pointed out in the claims, it being understood that I do not intend to limit myself to the details of construction.

In the drawings, like parts throughout the views are given like numerals and are thus identified in the following detailed description:

In the drawings:

Figure 3 is a front view of the tractor and attached cutting mechanism.

Figure 4 is a side view looking toward the tractor from the cutter or saw side.

Figure 5 is a side view of the power take-off side of the tractor and shows a novel gear shifting drive arrangement for the same.

Figure 6 is a detail of a chain and sprocket drive to a sprocket on the jack shaft of the machine from a larger sprocket wheel on one of the tractor rear wheels, on the saw side of the tractor.

Figure 7 is a modified form or an alternate arrangement of Fig. 5.

Figure 8 is a detail view partly in cross section of the saw or tool positioning mechanism and showing its connection to the saw drive shaft housing.

Figure 9 is a fragmentary section of the screw feeding lugs for imparting movement to the saw or tool holder as generally shown in Figure 8.

Figure 10 is a fragmentary view of the saw drive shaft and the relative position of the driving arrangement for the saw, while the saw is in a perpendicular plane above the ground as for sawing horizontal timber.

Figure 11 is a view like Figure 10, but shows the saw driving arrangement shifted for driving the saw in a vertical plane above the ground for sawing felled timber into strips or boards.

Figure 12 shows the drive shaft connection from the pulley side of the tractor connected to the mechanism shown in Figures 10 and 11 for positioning the saw horizontally or vertically with respect to the ground.

Figure 13 is a fragmentary perspective view showing the front side of a dash board near the driver's seat and the controls for the machine.

Figure 14 is a fragmentary perspective view of my novel jack mechanism used in connection with the saw for holding logs or the like.

Figure 15 is a detail of the link control for forward projection or retraction of the jack.

Figure 16 is a fragmentary detail view showing the saw raised to a vertical plane from the ground for trimming branches from a felled tree or for cutting the log after trimming longitudinally into boards or the like.

Figure 17 is a view like Figure 16, but looking along the length of the saw drive shaft housing and showing the shaft linkage and the drive connections.

Figure 18 is a fragmentary elevational view of the tool housing supporting frame structure, with a dotted line representative of the low position of the tool housing or saw to the ground, if such a tool is mounted therein.

Figure 19 (Sheet 6) is a cut away elevational view of the casing for the raising and lowering, the flexible control rod therefor with a connected locking dog for holding the casing in adjusted position.

Figure 1:
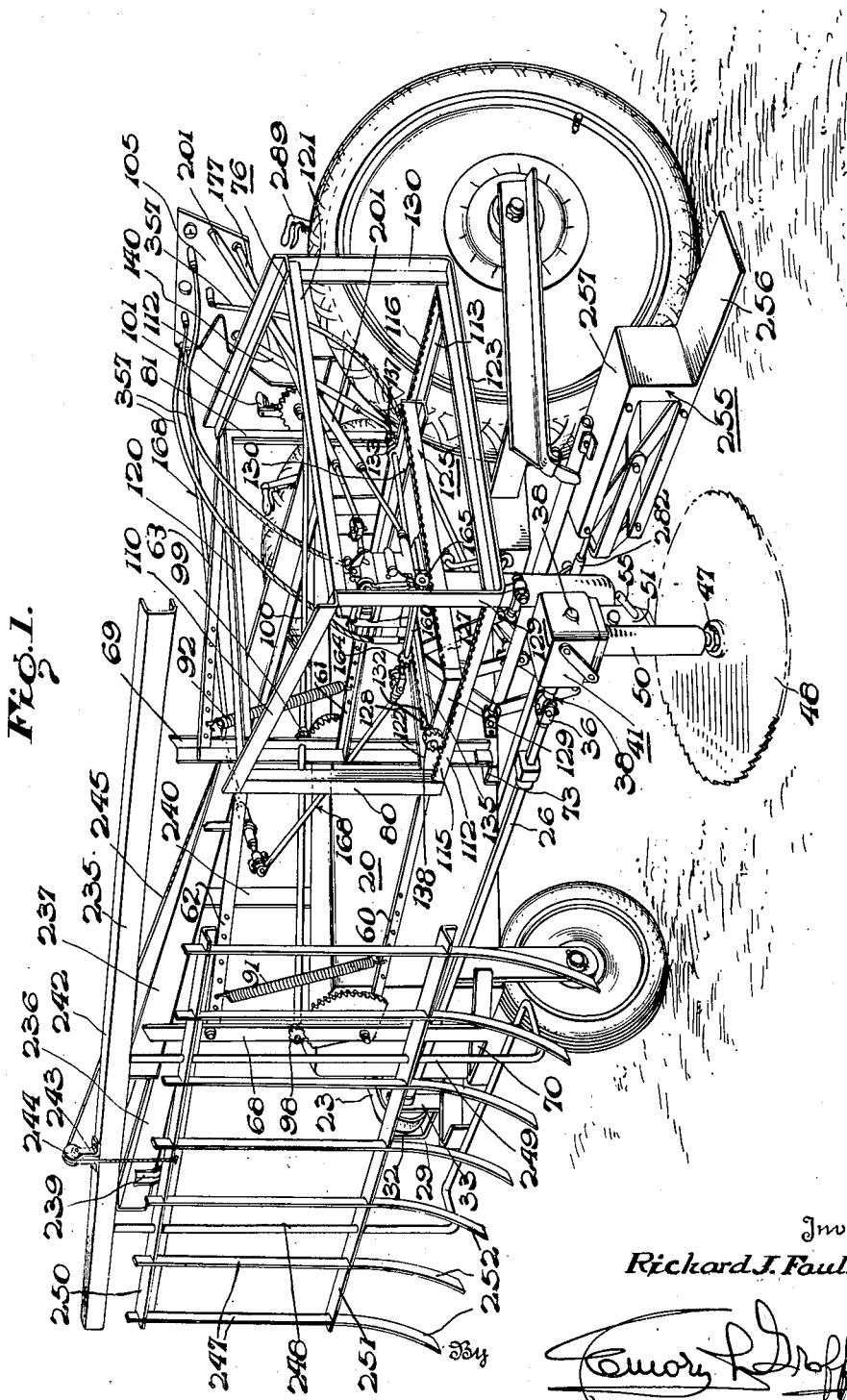
Figure 1 is a general perspective view of a tractor with a novel wood cutting mechanism attached.
Figure 2:
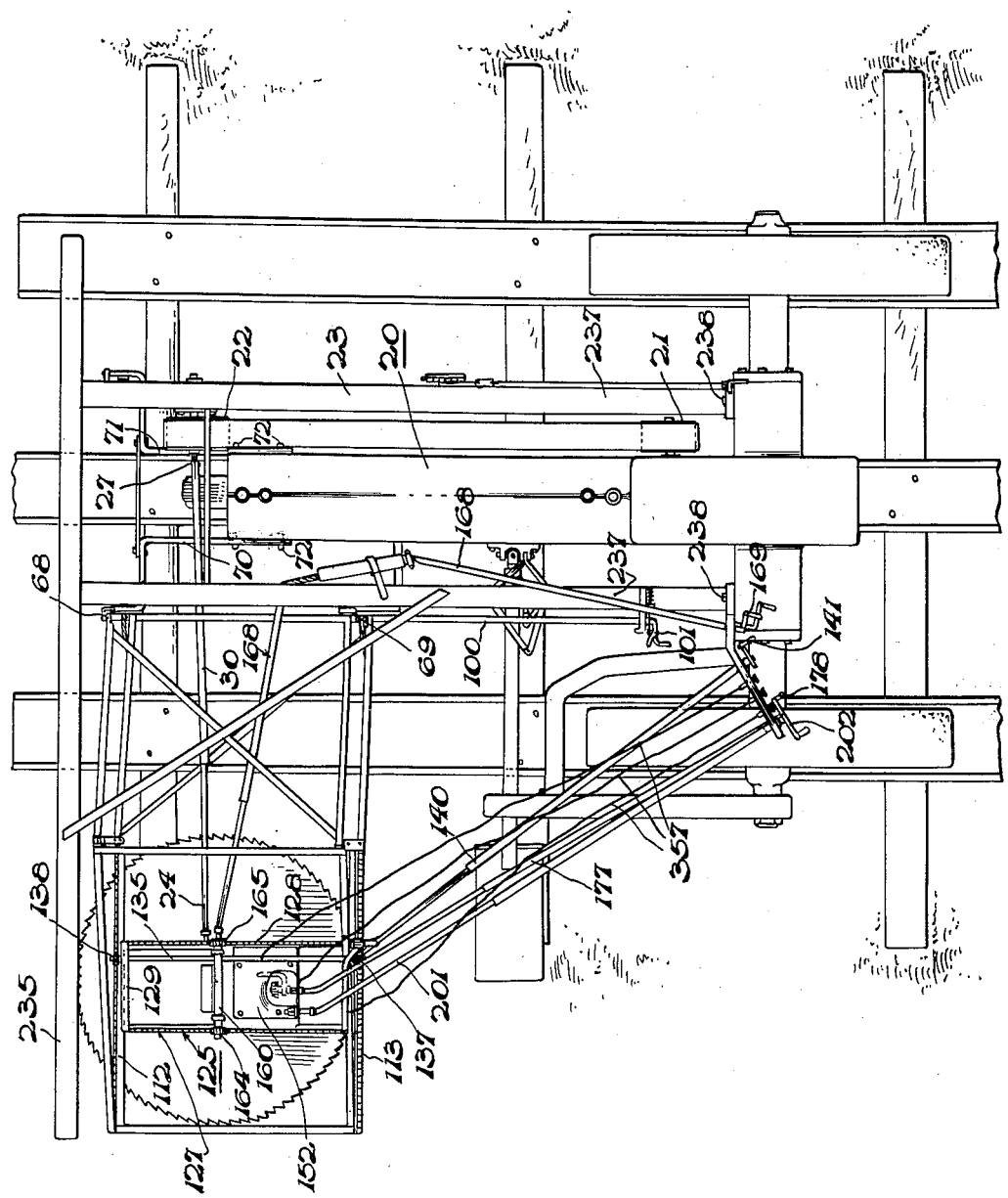
Figure 2 is a top plan view of the arrangement shown in Fig. 1.

Referring in detail to the figures in the drawings, and first with particular reference to Figures 1, 2 and 3, there is shown a tractor 20 having power take-off pulleys 21 and 22 on one side. The pulley 21 drives the pulley 22 by a belt 23.

The pulley 22 imparts rotation to a drive shaft 26 through a stub axle shaft 27 and a universal joint 28.

The drive shaft 26 is in two sections 24 and 30. The smaller section is telescopically mounted within the larger section 30 to allow for extension of the shaft to control the saw raising and lowering mechanism to be described hereinafter.

The axle shaft 27 is mounted in a bracket 29 secured to the front end of the tractor, which bracket 29 comprises a pair of arms 32 and 33 having bearings 34 mounted in their free ends for the axle shaft to turn in.

The drive shaft 26 extends across the front end of the tractor 20 and terminates on the opposite side of the tractor from the pulley drive into a universal joint 36. The universal joint 36 connects with a shaft 38 journalled for rotation in the walls 39 and 40, see Fig. 10, of a transmission housing 41.

In the housing 41, keyed to the shaft 38 is a bevel gear 44, which meshes with a second bevel gear 45, keyed to an elongated shaft 47 to which is secured a disc saw 48. This saw carrying shaft 47 extends axially through the bore of an elongated cylinder 50, which cylinder 50 extends from the transmission housing 41 as a part thereof and has formed from its outer cylindrical surface a bracket 51. The bracket 51 comprises a flat fin extending axially from the outer surface of the cylinder 50 and has an opening in its lower end toward the saw 48 and a second opening in vertical alignment with the first mentioned opening. In the lower opening above the saw on a pin is pivoted a link 55 and in the other opening on a pin 56 are pivoted the lugs of a bifurcate bracket 57, which representative link 55 and bracket 57 serve as transmitting members to move the saw 47 to various positions, such as to a horizontal plane or to a vertical with respect to the ground. The precise novel functions of the link and bifurcated bracket 57 will be explained more fully after a detailed description is given of the novel framework for mounting the saw driving raising and lowering mechanism. This framework is mounted on the opposite side of the tractor from the power take-off pulleys 21 and 22 and comprises four bars 60, 61, 62 and 63 spaced apart in the form of a rectangle, see Figure 18 for this in detail on a magnified scale. The top bars of the frame, namely 62 and 63, have end openings with pivot pins 64 and 65 therein, which pins 64 at one end of the bars are mounted in the upper portion of a pair of vertically extending upright angle bars 68 and 69. The bar 68 is connected to one of a pair of similar substantially L-shaped brackets 70 and 71 secured to the front end of the tractor 20 by suitable means, such as bolts 72, see Fig. 2.

The angle bar 69 is secured to a bracket 73, see Fig. 1, which bracket projects from the side of the tractor chassis to a predetermined point rearwardly of the bracket 70 at the front end of the tractor. Thus the top bars 62 and 63 are spaced apart at this plane or level in substantially parallel relation.

The other ends of the top bars 62 and 63 are pivotally connected to a pair of vertically spaced flat bars 80 and 81 of a second frame 76 comprising a rectangular arrangement of bars, hereinafter to be described, while the bottom bars 60 and 61 are connected pivotally to the lower ends of the flat bars 80 and 81.

The bottoms bars 60 and 61 are pivoted on pins 84 and 85, respectively. These pins are mounted in the upright angle bars 68 and 69 in a plane or on a level below the top bars 62 and 73. Rigidly secured to the bottom bars 60 and 61 are gear sectors 87 and 88. These gears sectors each are pivoted on one of the respective pins 84 and 85 at the apex of each sector, and as they are rigidly secured to the bars 60 and 61 by rivets 89, for example, will move with these bottom bars as they swing up or down on the pins 84 and 85.

Normally the top and bottom bars are retained in a substantially horizontal plane partially by the aid of oppositely positioned coil springs 91 and 92, each with hooked ends 93. Each hooked end 93 is hooked through one of the openings 94 in the top and bottom bars, which openings are arranged in rows along the bars, so that the springs 91 and 92 may be each connected between a top and bottom bar on a bias, as best shown in Figure 18. The cross bars 60, 61, 62 and 63 must be securely fastened by brace bars, such as are generally designated by the numeral 95.

The angle bars 68 and 69 are provided with bearing openings for mounting a pinion shaft 97 to which are keyed pinion gears 98 and 99. These mesh with the sector gears 87 and 88; for example pinion 98 meshes with sector gear 87, so that when the pinion shaft 97 is turned by a rod 100 with a hand crank 101 mounted in front of the driver's seat, not shown, the sector gears and attached bars 60 and 61 will thus be swung up or down from the plane of the pivot pins 84 and 85. This movement of the bottom bars 60 and 61 will cause a like motion to be imparted to the top bars 73 and 74 by reason of their pivotal connection to the bottom bars through the bars 80 and 81.

Leading off from the top and bottom ends of bars 80 and 81 and rigidly secured thereto by welding, for example, are top angle bars 110 and 111 and bottom angle bars 112 and 113. The top edges of the bottom bars 112 and 113 are each formed with teeth 115 and 116, to thereby provide rack bars as they will hereinafter be termed. Each pair of oppositely disposed ends of each of the spaced top bars and the respective spaced bottom rack bars are connected together by cross bars. For example the top bars 110 and 111 are joined by cross bars 120 and 121 and the bottom rack bars are connected by cross bars 122 and 123. Thus there is provided a rigid frame 76 pivotally connected by the link bars 60, 61, 62 and 63 of the first frame to the side of the tractor 20.

Mounted within the frame 76 is an oblong or rectangular rigid frame 125 having side rack bars 127 and 128 of angle iron construction, which are at substantially right angles to the rack bars 112 and 113 of the frame 76, and just short of the teeth 115 and 116 of the rack bars 112 and 113 are the end bars 129 and 130 of the frame 125, see Fig. 1.

Journalled in bearings 132 and 133 secured to the center top edges of each end bar 129 and 130 is an elongated pinion shaft 135. On each end of the shaft 135 is keyed a pinion gear 137 and 138 Figure 2, which overhangs the rack teeth 115 and 116, to thereby mesh therewith. A flexible shaft 140 from the dashboard 105 is turnable by a hand crank 141, see Fig. 13, whereby the pinion shaft 135 is rotated with the pinions 137 and 138 and thus moves the frame in one direction or the other along the rack bars 112 and 113. This movement of the frame 125 has a particular function as it carries and positions the raising and lowering mechanism for the saw 48. This raising and lowering mechanism is generally designated 150 and is shown in detail in Figure 8, and is pivotally linked to the bracket 51 on the hereinbefore described cylindrical housing 50 by bracket 57 and link 55.

The angle iron rack bars 127 and 128 have mounted thereon a slidable head 152 comprising a pair of plates 153 and 154 which is a part of or welded to a cylinder 192 held together by bolts 156 on each side of the horizontal legs 157 and 158 of the bars. These plates are substantially square and are arranged to traverse along the length of the legs 157 and 158 by the rotation of a pinion shaft 160 journalled in bearings 161. The ends of the pinion shaft 160 each have pinion gears 164 and 165 keyed thereto in mesh with the teeth 167 and 166 of the rack bars 127 and 128, respectively. Thus the entire saw housing and saw 47 may be moved back and forth along the side of the tractor 20 in the frame 125, by a flexible rod 168 by control crank 159, while the frame 125 may be moved back and forth to and from the side of the tractor 20 in the frame 76 to position the saw 48 in different locations out from the side of the tractor by crank 141. During this positioning of the saw and its entire housing, the saw 48 may be in either a vertical or a horizontal position with respect to the ground and at any of several different heights or elevations from the ground surface, all of which positions are mechanically controllable from the dashboard 105.

For example, the head 152, see Fig. 8, carries and mounts the raising and lowering mechanism 150, which comprises an upper casing 170 having a cover plate 171. The cover plate 171 has an elongated slot therein across which is mounted an axle shaft 173 for a cog or gear wheel 174. The shaft 173 is connected by a universal joint 175 and a flexible shaft 177 to a crank 178 on the dashboard 105, and the axle shaft 173 turns in a bearing 179 secured to the cover plate 171, while the toothed rim of the cog 174 rotates partially without and within the casing 170. Inside the casing the cog 174 meshes with a second cog or gear wheel 181 which cog 181 is mounted on a hollow elongated sleeve 182, which has a short section in its interior bore formed with worm teeth or spirally coiled lugs 184, see Fig. 9. The worm lugs 184 mesh in a worm groove 186 on a shaft 187 extending axially through the sleeve 182, to pivotally connect with the end of the link 55 by a pin 188. The link 55 connects at its other end to the bracket 51 carried by the cylindrical saw housing 50.

An outer sleeve or cylinder 190 is concentrically mounted around the sleeve 182. The cylinder 190 includes a shoulder 191 on which rests the rim of the hollow cylinder 192 depending from the under side of the casing 170, and the sleeve or cylinder 190 extends upwardly through the cylinder 170 around the sleeve 182. The end of the cylinder 190 stops below the gear wheel 181 so as to leave a space to thereby expose the sleeve 182; and the cylinder 190 has secured to this end a worm gear 194, as by a key 195. A worm shaft 197 is journalled in the wall of casing 170 and a bearing 198 inside the casing. This worm shaft projects through the wall of the casing 170 to the outside thereof and connects with a universal joint 200 and a flexible shaft 201. The flexible shaft 201 leads to the dashboard and the hand crank 202. By turning the shaft 201 the worm gear 194 is rotated and thus imparts rotation to the cylinder 190 the bottom of which is secured to the bifurcated bracket 54 pivoted to the upper part of bracket 51 on the saw housing 50. A substantial one quarter turn of the worm gear 194 will put the saw shaft 47 substantially parallel to the drive shaft 26 by swinging the same from the position shown in Fig. 1 to the position shown in Figures 16 and 17.

This alignment of the saw shaft 47 with the drive shaft 26 and shaft 38 is made possible due to the swinging sections 210 and 211 of the housing 41, see Figs. 10 and 11, connected together by links 212 on each side thereof. These links 212 hold two sets of sector-like gear teeth 214 and 215 in mesh with each other.

The sections 210 and 211 are separated and closed by turning control shaft 201, connected to a novel chain of linkage 231 and 232 secured from link 230, which link is pivotally anchored at one end by ring 233 to automatically hold section 211, see Fig. 11, approximately 180 degrees out from the drive shaft 26, see Figure 16, when the sections are separated and also see Figure 3 and the arrow to show the direction of the ninety degree upward swing of the saw shaft. The link 232 is formed with two crank arms a and b and a central base section c which is pivoted to the sleeve 190. With the saw 48 in this position, by turning control shaft 140 limbs can be cut off either side of a tree along the side of the tractor 20, or boards sawed off of cut logs, etc.

As crank 202 is turned, the linkage system holds shaft 38 pointing toward the pulley 22, see Figure 12, in a one-quarter turn of sleeve 190 by means of a link 332 securely fastened at one end to the underside of plate 154 of the lifting mechanism housing 150, Figures 4 and 8.

This link 332 connects to a link 331 pivotally connected to the arm b of link 232, which link 232 when pivoted onto sleeve 190 at the bar section c automatically changes the position of arm a on link 232 from the position shown in Figure 10 to the position shown in Figure 11, while the sleeve 190 is making a one-quarter turn, that is, a ninety degree swing. For example, in Figs. 3, 4, 16 and 17 link 332 is rigidly connected to the underside of housing 150, and is thus always in the same position with respect to the housing. The link 331, however, changes position, see Figs. 16 and 17, since link 232 is pivoted on sleeve 190 at c and therefore when sleeve 190 is rotated a quarter turn, the distance from the pivot point c and the eyelet end of the link 332 changes. So, in turn, the lower end of the arm a of the link 332, Figs. 10 and 11 changes from one position to another automatically through the power thus imparted through the said linkage from the quarter turning of the sleeve 190.

Now referring to Figures 1, 4 and 5, the tractor 20 is provided with a tree bumper bar 235, which connects to the tractor body by beams 236 and 237. The beams are secured to the tractor transmission housing by bolts or the like, not shown, and extend at an upward slant beyond the front hood and are braced by a V-bracket 239 secured to the front of the hood, see Figure 5.

The beams may be further braced by a U-bracket 240 secured to the tractor chassis, by welding or the like, so that each leg of the bracket 240 connects to the midsection of the beams.

The top surface 242, see Figure 1, may, if desired, be provided with a pulley bracket 243 and a pulley wheel 244. A cable 245 is looped around the pulley and attached to a brush rake 247. This brush rake 247 is very handy if the saw 48 is being used for brush cutting, as this provides for collecting the cut brush in piles for burning. The brush rake 247 is mounted on guide rods 248 and 249, which extend through aligned openings in transverse brace bars 250 and 251 between the tines 252 of the rake.

After trees have been felled and stripped of their branches, the logs or stripped trunks are heavy and difficult to handle and accordingly I have provided a jack 255 having a low step 256 and a high step 257, see Figure 14. It is to be used when cutting logs or felled trees to prevent pinching the saw blade, which are in resting contact at each end, such as resting on the ground or stump at one end and on the limbs of the tree or on some elevated object at the other end. For example, when the saw is started to cut through a log so supported, soon the gap formed by the cut when sawed from the top or side will begin to close and pinch the saw, thus either causing breakage of the saw parts or stalling of the motor. With the jack 255 this saw pinching is eliminated, as the jack may be inserted under the log as it is being sawed to support the log at this point and prevent the saw cut gap from closing on the saw.

The steps 256 and 257 are made relatively low and high to facilitate insertion under a log regardless of any variations in distance above the ground. For instance, if a trunk or log has settled to only about three inches above the ground surface the high step 257 cannot go under the log, but the low step 256 may be used.

This jack is manually shiftable in and out from the side of the tractor by a crank arm 260 and shaft 261 having a forked end 262. The forked end 262 fits through an actuating linkage 264, to thereby operatively connect to the floating pivotal points of a four link shifting arrangement, comprising a pivot pin 266 in a bracket 267 on a movable hollow tube 268 secured by a bracket 269 to the jack 255. Mounted on the same pivot pin 266 are diverging links 270 and 271. The free ends of these diverging links, are pivotally connected to the ends of the actuating linkage members 264 and the free ends of a second pair of links 274 and 275 diverging in the opposite direction until they pivotally mount at their respective ends on a pin 276 in a bracket 277 fixed to the tractor frame.

This bracket 277 also holds an end of a rod 280, which is smaller in circumference than the bore of the hollow tube 268. Thus by turning the crank 260 the toggle arrangement just described will move the hollow tube 268 in or out over the rod 280, so that either the lower step 256 or the high step 257 may be forced under a log.

For example, see Figure 5, when it is desired to drive shaft 282, Figs. 1 and 4, a lever 289 is shifted. This lever connects by a shaft 290 to an arm 291 of a pivoted gear carrier plate 292, which plate carries the gear 287 of the gear train. The gear 287 is mounted on an axle pin 294, which axle extends from the plate 292 on the opposite side adjacent the under surface of the top reach of belt 23. Keyed on the axle is a friction roller 295. Similarly mounted just below the axle pin 294 is another axle pin 296 to which is keyed a gear 286. The gear 286 is in mesh with the gear 287, and on the axle pin 296 spaced from the roller 295 is roller 296'. These rollers 295 and 296' are arranged to alternately engage with the top and bottom reaches of the belt 23. For example, the top roller 295 engages under the top reach of the belt when lever 289 is pulled back, and when the lever is pushed forward the lower roller 296' will engage with the bottom reach of the belt. When the lower roller is in engagement rotation is imparted to shaft 282, so as to raise the jack 255, and when the upper roller 295 is in engagement with the top reach of the belt 23 the jack is lowered. As shown in Figure 5, the rollers 295 and 296' are set so as to both be out of belt engagement. As the shaft 282 rotates it drives a screw shaft 298, see Fig. 14, connected by a universal joint 299 to shaft 282. The screw shaft extends in under the jack step 257 and threads through openings in a pair of cross plates 300 and 301, having right hand and left hand threaded openings therein and which are a part of the jack raising and lowering toggle system.

The plates 300 and 301 have reduced ends or pintles 302. The pintles of the plate 300 engage through openings in the ends of a pair of toggle links 304 and 305 and also through the end of the toggle actuator link 306. This actuator link contains an elongated slot 308 in which the pintles of plate 301 are adapted to ride, while the other end of the link 306 is pivoted on a pin 309 together with the end of a pair of toggle links 310 and 311.

Each diverging end of each link 304 and 305 and 310 and 311 is pivoted on a pin in a framework made in two sections, such as 315 and 316. Their inner frame section 315 is Z-shaped so as to be an integral part of the low and high steps 256 and 257, and the ends of links 304 and 310 are pivotally connected thereto on pins 318, while the frame section 316 serves as the base of the jack and the links 305 and 311 are pivoted thereto on pins 320.

The jack raising screw shaft 298 is driven through the universal joint 299 connected to one end by shaft 282, and this screw shaft is formed with right hand threads 321 from the other end thereof to a point intermediate the plates 300 and 301. The right hand threads screw through the right hand threaded openings in plate 300. From this intermediate point the shaft 298 is formed with left hand threads 322, which thread through the said left hand threaded opening in plate 301. Thus when screw shaft 298 is turned to the left it pulls plate 301 toward the side of the tractor and pushes plate 300 away from it, thereby causing the toggle links 304 and 305 on each side of the jack to form a substantially straight line and raise the frame section 315 from the base section 316. As this is done bar 306 will cause the toggle links 310 and 311 to similarly straighten into alignment as the pintles 306 move along slot 308 to cause the entire jack top to raise evenly.

In this position a log on the step 257 is sufficiently elevated to be sawed into boards. Thus it is seen that the jack 255 has horizontal motion and also a limited vertical raising action for positioning cut logs. The entire jack may be raised up by a hand lever 330 mounted on an elongated roller 331. The roller 331 is journalled at one end in a jack supporting frame 334 and at the other end in the tractor frame. The tractor frame at the journal point for roller 331 supports an arcuate rack 335, which is secured to the tractor frame by bolts 336. The lever 330 swings adjacent the rack 335 and may be locked to any shifted position by a dog 338 operated by handle 339.

In Figure 7 of the drawings is shown a modification of the gear train for driving the shaft 282, which instead of the pulley 283 mounts a gear 341 and the gear carrier plate 292 includes straps 342 and 343 to journal a worm shaft 344. The gears 287 and 286 are the same, except that gear 286 has mounted on its shaft a bevel gear 345 instead of a pulley. This bevel gear meshes with a second bevel gear 346 keyed on the end of worm shaft 344. Thus a worm shaft or bevel gear arrangement may be substituted for a belt and pulley drive.

This modified form may be used in combination with a low speed tractor drive means for imparting forward and backward movement of the tractor 20 beside a log being cut into boards. For example, in Fig. 6, a sprocket wheel 350 is keyed onto shaft 232 and drives a relatively larger sprocket wheel 351 on the tractor rear axle by a sprocket chain 353. Use of the tractor's normal drive is too fast for the saw to rip the log. To guide the tractor 20 during this forward and backward motion, I have provided a track 354, Fig. 4, to receive the wheels 355 thereof.

*Operation*

The machine is operated entirely from the driver's seat and for the most part by the controls in the dashboard 105. For example, to cut down a tree the tractor 20 is driven so as to engage the bumper 235 with a tree trunk and the saw 48 is positioned for the desired elevation from the ground by turning control 101, see Figs. 1 and 2.

After adjusting of height the saw housing 50 may be moved longitudinally along the side of the tractor or in or out from the side by turning shafts 140 or 168 by means of cranks 141 or 169 mounted in the dashboard 105.

Power is supplied through shaft 26 to rotate the saw 48 through bevel gears 44 and 45 in the transmission housing 41. By unlocking and turning control 178 the saw is put into tree-cutting position, as shown in Figures 10 and 17. After the tree has been felled, it may be trimmed by turning shaft 201 by crank 202 and the worm gear 194 is rotated approximately a one-quarter turn, to thereby swing apart the housing 41 and position the saw shaft 47 into substantial alignment with the telescopic drive shaft 26. When in this position the saw blade 48 is vertical from the ground and the linkage chain 231 will automatically hold the section 211 of the transmission housing 41, see Figures 11 and 16, approximately 180 degrees out from the drive shaft 26. With the saw 48 in this position limbs can be cut off either side of the tree alongside of the tractor by turning the control crank 169.

Each of the several controls may, if desired, be provided with cable latch operators 357, such as the well known Bowden wire cables, operable from dashboard 105. The end of each cable being connected to a locking dog adapted to be moved into and out of engagement with the gear teeth of each of the several gears on the ends of control shafts 140, 168, 177 and 201. An example of this locking arrangement is shown in Fig. 19, and comprises a Bowden wire cable 357 connected to a locking dog 358, slidable in a bracket 359 formed as a part of or welded to the head 170, shown in Fig. 8, so the dog meshes with teeth 166.

The use of the brush rake seems obvious and accordingly it is thought that without further description the operation of the machine is clearly understandable.

While there has been shown and described only one embodiment of the machine, except for the detailed modification shown in Figure 7, it is to be expressly understood that the same is not limited thereto but may be embodied in various other mechanical forms. Reference will be had to the appended claims for a definition of the limits of the invention.

I claim:

1. A tractor having a dashboard with a plurality of controls, take-off pulleys, a drive shaft rotatable thereby, a gear train driven by said shaft, a driven shaft driven by said gear train, a saw secured to the end of said driven shaft, a housing for said gear train, said housing being formed of two sections pivoted together, one of said sections serving to mount a gear from said drive shaft and the other of said sections serving to mount a gear connected to said driven shaft, an elongated cylinder around said driven shaft secured to said last section, saw positioning means pivotally connected to said cylinder and supported from the side of said tractor, and means connected to said cylinder operable by one of said dashboard controls adapted to move said cylinder and driven shaft therein to thereby position said saw from one cutting plane to another, and control shafts rotatable from said dashboard adapted to move said saw positioning means longitudinally along the side of the tractor or in and out from the side thereof, whereby said saw is positioned as desired with respect to the side of the tractor in said established cutting plane.

2. A tractor having a dashboard with a plurality of controls, take-off pulleys, a drive shaft rotatable thereby, a gear train driven by said shaft, a driven shaft driven by said gear train, a saw secured to the end of said driven shaft, a housing for said gear train, said housing being formed of two sections pivoted together, one of said sections serving to mount a gear from said drive shaft and the other of said sections serving to mount a gear connected to said driven shaft, an elongated cylinder around said driven shaft secured to said last section, saw positioning means pivotally connected to said cylinder and supported from the side of said tractor, means connected to said cylinder operable by one of said dashboard controls adapted to move said cylinder and driven shaft therein to thereby position said saw from one cutting plane to another, control shafts rotatable from said dashboard adapted to move said saw positioning means longitudinally along the side of the tractor or in and out from the side thereof, whereby said saw is positioned as desired with respect to the side of the tractor in said established cutting plane, and latch means adjacent each control shaft adapted to lock said saw positioning means in various adjusted positions.

3. A portable saw mill comprising a tractor with a motor, a power take-off pulley driven by said motor, a second pulley, an endless belt drivably connecting said pulleys, a shaft driven by said second pulley, a gear on the other end of said shaft, a second gear in mesh with said first gear, said second gear being keyed to a driven shaft having a saw mounted on an end thereof, whereby said saw is rotated by said gears, means for adjusting said saw to various positions from the side of the tractor and to varying heights above the ground for efficient sawing of logs or the like into boards, and an auxiliary drive adapted to be alternately connected to the upper or lower belt sections to impart forward and reverse rotation to the rear axle of the tractor at a relatively slower speed than possible with the conventional drive of the tractor, whereby the tractor may move back and forth so as to feed the saw back and forth along the length of the log or the like being sawed into boards, said auxiliary drive comprising a plate rockably mounted on a pin extending from the side of the tractor between the upper and lower sections of the said belt, a pair of spaced shafts extending from the plate one above the other, a combined gear and roller mounted on each of said shafts, said gears being in mesh, means for rocking said plate toward one or the other of the upper or lower belt sections to thereby engage the upper roller with the upper belt section and the lower roller with the lower belt section, a driven shaft rotatable by one of said gears, and means mounted on the rear axle of the tractor connected to said driven shaft adapted to impart rotation to the gear axle of the tractor as the gears are rotated by their respective rollers.

4. A portable saw mill comprising a tractor with a motor, a power take-off pulley driven by said motor, a second pulley, an endless belt drivably connecting said pulleys, a shaft driven by said second pulley a gear on the other end of said shaft, a second gear in mesh with said first gear, said second gear being keyed to a driven shaft having a saw mounted on an end thereof, whereby said saw is rotated by said gears, means for adjusting said saw to various positions from the side of the tractor and to varying heights above the ground for efficient sawing of logs or the like into boards, and an auxiliary drive adapted to be alternately connected to the upper or lower belt sections to impart forward and reverse rotation to the rear axle of the tractor at a relatively slower speed than possible with the conventional drive of the tractor, whereby the tractor may move back and forth so as to feed the saw back and forth along the length of the log or the like being sawed into boards, said auxiliary drive comprising a plate rockably mounted on a pin extending from the side of the tractor between the upper and lower sections of the said belt, a pair of spaced shafts extending from the plate one above the other, a combined gear and roller mounted on each of said shafts, said gears being in mesh, means for rocking said plate toward one or the other of the upper or lower belt sections to thereby engage the upper roller with the upper belt section and the lower roller with the lower belt section, a driven shaft rotatable by one of said gears, and a chain and sprocket drive including a sprocket mounted on said rear axle of the tractor and a second sprocket on said driven shaft, whereby rotation is imparted to the rear axle of the tractor as the gears are rotated by their respective rollers.

RICHARD J. FAULKNER.

REFERENCES CITED

The following references are of record in the file of this patent:

UNITED STATES PATENTS

| Number | Name | Date |
|---|---|---|
| 145,499 | Greenough | Dec. 16, 1873 |
| 853,564 | Priest | May 14, 1907 |
| 972,517 | Diamond | Oct. 11, 1910 |
| 1,028,992 | Campbell | June 11, 1912 |
| 1,243,189 | Krausch et al. | Oct. 16, 1917 |
| 1,389,970 | Noel | Sept. 6, 1921 |
| 1,602,357 | Georgelis | Oct. 5, 1926 |
| 1,901,915 | Loughridge | Mar. 21, 1933 |
| 2,187,707 | Kane | Jan. 16, 1940 |
| 2,312,287 | Renner | Feb. 23, 1943 |
| 2,330,996 | Rivers | Oct. 5, 1943 |
| 2,332,526 | Pehel | Oct. 26, 1943 |
| 2,354,625 | Van Sickle | July 25, 1944 |
| 2,365,408 | Hillyer | Dec. 19, 1944 |
| 2,411,623 | Jaques | Nov. 26, 1946 |
| 2,411,624 | Jaques | Nov. 26, 1946 |

FOREIGN PATENTS

| Number | Country | Date |
|---|---|---|
| 718,235 | France | Nov. 4, 1931 |